US007352544B2

(12) United States Patent
Al-Haddad

(10) Patent No.: US 7,352,544 B2
(45) Date of Patent: Apr. 1, 2008

(54) METHOD AND APPARATUS FOR PROVIDING A REMEDIAL STRATEGY FOR AN ELECTRICAL CIRCUIT

(75) Inventor: Kamal Al-Haddad, Montreal (CA)

(73) Assignee: Pratt + Whitney Canada Corp., Longueuil, Quebec (CA)

( * ) Notice: Subject to any disclaimer, the term of this patent is extended or adjusted under 35 U.S.C. 154(b) by 496 days.

(21) Appl. No.: 11/175,185

(22) Filed: Jul. 7, 2005

(65) Prior Publication Data

US 2007/0008669 A1 Jan. 11, 2007

(51) Int. Cl.
*H02H 7/122* (2006.01)
(52) U.S. Cl. .................. 361/23; 361/13; 323/220; 323/223; 323/225; 363/50; 363/53; 363/56.01; 363/56.02; 363/55; 324/522
(58) Field of Classification Search .............. 361/23, 361/13, 50; 323/267; 363/50, 53, 56.01, 363/56.02, 55; 324/522; 318/434
See application file for complete search history.

(56) References Cited

U.S. PATENT DOCUMENTS

| | | | |
|---|---|---|---|
| 3,609,507 A | 9/1971 | Beck | |
| 4,281,375 A * | 7/1981 | Pouillange | 363/37 |
| 4,447,867 A | 5/1984 | Evams et al. | |
| 4,788,415 A * | 11/1988 | Whipple, Jr. | 219/508 |
| 4,868,826 A * | 9/1989 | Smith et al. | 714/10 |
| 4,939,730 A * | 7/1990 | Tarver | 714/4 |
| 5,172,310 A | 12/1992 | Deam et al. | |
| 5,191,518 A | 3/1993 | Recker et al. | |
| 5,339,235 A | 8/1994 | Shekhawat et al. | |
| 5,499,186 A | 3/1996 | Carosa | |
| 5,604,423 A * | 2/1997 | Degeneff et al. | 323/258 |
| 5,611,112 A * | 3/1997 | Rock et al. | 16/237 |
| 5,685,043 A * | 11/1997 | LaManna et al. | 15/256.52 |
| 5,798,703 A * | 8/1998 | Sakai et al. | 340/666 |
| 6,083,369 A * | 7/2000 | Tanigawa | 204/424 |
| 6,087,799 A | 7/2000 | Turner | |
| 6,566,764 B2 | 5/2003 | Rebsdorf et al. | |
| 7,128,120 B2 * | 10/2006 | Orbeck et al. | 160/89 |
| 2003/0086213 A1 | 5/2003 | Asaeda et al. | |

FOREIGN PATENT DOCUMENTS

WO WO 01/35432 5/2001

OTHER PUBLICATIONS

Development of Low Cost Multi-Phase Brushless DC (BLDC) Motors with Unipolar Current Excitations. Ttilak Gopalarathnam et al; 0-7803-5589-X/99 pp. 173-179, 1999 IEEE.

(Continued)

*Primary Examiner*—Rita Leykin
(74) *Attorney, Agent, or Firm*—Ogilvy Renault, LLP

(57) ABSTRACT

A method and electrical circuit for dynamic reconfiguration of a DC-to-AC inverter comprising first and second power rails where each the rails has a power source. The method comprises monitoring the first and second power rails for short-circuit failure; and upon failure of one of the power rails, disconnecting the failed power rail from its power source.

10 Claims, 6 Drawing Sheets

OTHER PUBLICATIONS

Multi-Phase Fault-Tolerant Brushless DC Motor Drives, Tilak Gopalarathnam et al., 0-7803-6401-5/00; pp. 1683-1688, 2000 IEEE.

Remedial Strategies for Brushless DC Drive Failures, René Spée. IEEE Transactions on Industry Applications, vol. 26, No, 2, Mar.-Apr. 1990; pp. 259-266.

Remedial Strategy for a Permanent Magnet Synchronous Motor Dirve; A Krautstrunk, P. Mutschler et al. EPE '99, Lausanne, pp. 1-10, EPP-1999.

* cited by examiner

METHOD AND APPARATUS FOR PROVIDING A REMEDIAL STRATEGY FOR AN ELECTRICAL CIRCUIT

TECHNICAL FIELD

This invention relates to the field of electronics. More precisely, this invention pertains to a method and apparatus for providing a remedial strategy for an electrical circuit.

BACKGROUND OF THE INVENTION

Electrical circuits having switching cells such as semiconductor devices (e.g., transistors) are problematic when the switching cells fail. The failure modes of these switching cells include open-circuit or short-circuit conditions. Most know remedial strategies only cover open-circuit switch failures. They therefore do not provide acceptable reliability of the original electrical circuit.

Accordingly, there is a need for improved remedial strategies for electrical circuits.

SUMMARY OF THE INVENTION

It is an object of the invention to provide a circuit and a method for enabling the implementation of a remedial strategy in a multi-phase DC-to-AC inverter.

According to a first aspect of the invention, there is provided an electronic circuit for maintaining electrical conditions at a connection point in a circuit. The electronic circuit comprises two circuit switches serially connected via the connection point in case of a failure of any one of the two circuit switches. The circuit comprises a first end and a second end between which the two circuit switches are located. The electronic circuit comprises a first actuable switch connected in parallel with the two circuit switches, a second actuable switch connected in series with the first end, a third actuable switch connected in series with the second end, and a control unit for controlling the first actuable switch, the second actuable switch and the third actuable switch depending on a status of any one of the two circuit switches.

According to another aspect of the invention, there is provided an electronic circuit for providing a remedial strategy in case of a failure of any one of two serially connected switches in an N-phase driving circuit, wherein each side of a given phase is connected between the two serially connected switches having current blocking means. The two serially connected switches comprise a first end and a second end between which the two serially connected switches are located. The electronic circuit comprises a first actuable switch, having current blocking means, connected in parallel with the two serially connected switches, a second actuable switch, having current blocking means, connected in series with the first end, a third actuable switch, having current blocking means, connected in series with the first end and a control unit for controlling the first actuable switch, the second actuable switch, and the third actuable switch depending on a status of anyone of the two serially connected switches.

According to yet another aspect of the invention, there is provided a method for dynamic reconfiguration of a DC-to-AC inverter comprising first and second power rails where each the rails has a power source. The method comprises monitoring the first and second power rails for short-circuit failure; and upon failure of one of the power rails, disconnecting the failed power rail from its power source.

Further details of these and other aspects of the present invention will be apparent from the detailed description and figures included below.

BRIEF DESCRIPTION OF THE DRAWINGS

Reference is now made to the accompanying figures depicting aspects of the present invention, in which.

It will be noted that throughout the appended drawings, like features are identified by like reference numerals.

DETAILED DESCRIPTION OF THE PREFERRED EMBODIMENT

Figure 1:
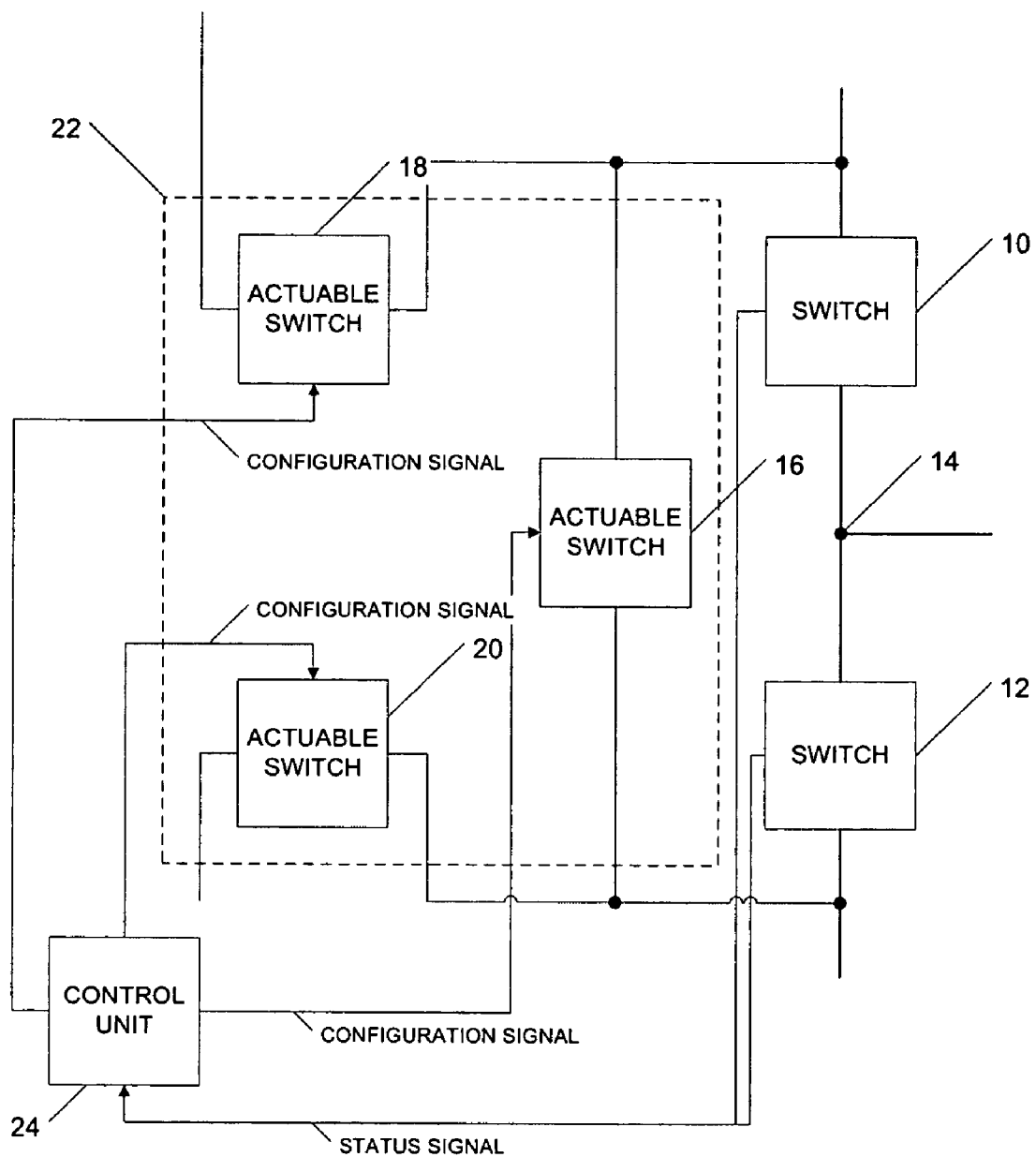
FIG. 1. is a block diagram showing an embodiment of a circuit for maintaining electrical conditions at a connection point between two circuit switches in the case of a failure of any one of the two circuit switches.

Now referring to FIG. 1, there is shown an embodiment of a circuit 22 for maintaining electrical conditions at a connection point 14 between a first switch 10 and a second switch 12 in case of a failure of any one of the first 10 and the second 12 switches.

The circuit 22 comprises a first actuable switch 16, a second actuable switch 18 and a third actuable switch 20. A control unit 24 is preferably used as explained below. The first actuable switch 16 is connected in parallel with the first switch 10 and the second switch 12. The second actuable switch 18 is connected in series with a first end of the assembly comprising the first switch 10. The third actuable switch 20 is connected in series with a second end of the assembly comprising the first switch 10 and the second switch 12.

The control unit 24 is used to control the first actuable switch 16, the second actuable switch 18 and the third actuable switch 20 depending on the state of the first switch 10 and the second switch 12. More precisely, the control unit 24 receives a first status signal from the first switch 10 and a second status signal from the second switch 12.

The control unit 24 provides a configuration signal to the first actuable switch 16, the second actuable switch 18 and the third actuable switch 20 depending on the first status signal and the second status signal.

It will be appreciated by the skilled addressee that each of the first switch 10 and the second switch 12 may be in a short-circuit failure mode and in an open-circuit failure mode outside a normal operating mode.

Each actuable switch may be actuated, by the control unit 24, to be in an open configuration (also referred to as an open-circuit mode) or in a close configuration (also referred to as a short-circuit mode).

For example, in the case where the first switch 10 is in a short-circuit failure mode, the control unit 24 may control the first actuable switch 16, the second actuable switch 18 and the third actuable switch 20 as follows.

The first actuable switch 16 and the second switch 12 may be switched to a short-circuit mode. The second actuable switch 18 and the third actuable switch 20 then operate as the first switch 10 and the second switch 12 were operating before the failure.

It is to be noted that any type of failure of both the first switch 10 and the second switch 12 may be handled using the first actuable switch 16, the second actuable switch 18 and the third actuable switch 20.

The skilled addressee will therefore appreciate that this is advantageous since it adds redundancy to an apparatus comprising two circuit switches. Furthermore, during normal operations, the second actuable switch 18 and the third actuable switch 20 are in a closed configuration while the first actuable switch 16 is in an open configuration. Upon short-circuit failure of one of switches 10 or 12, first actuable switch 16 will close while the second actuable switch 18 and the third actuable switch 20 will open. This, in effect, disconnects switches 10 and 12 from the circuit of which they form part.

Figure 2:
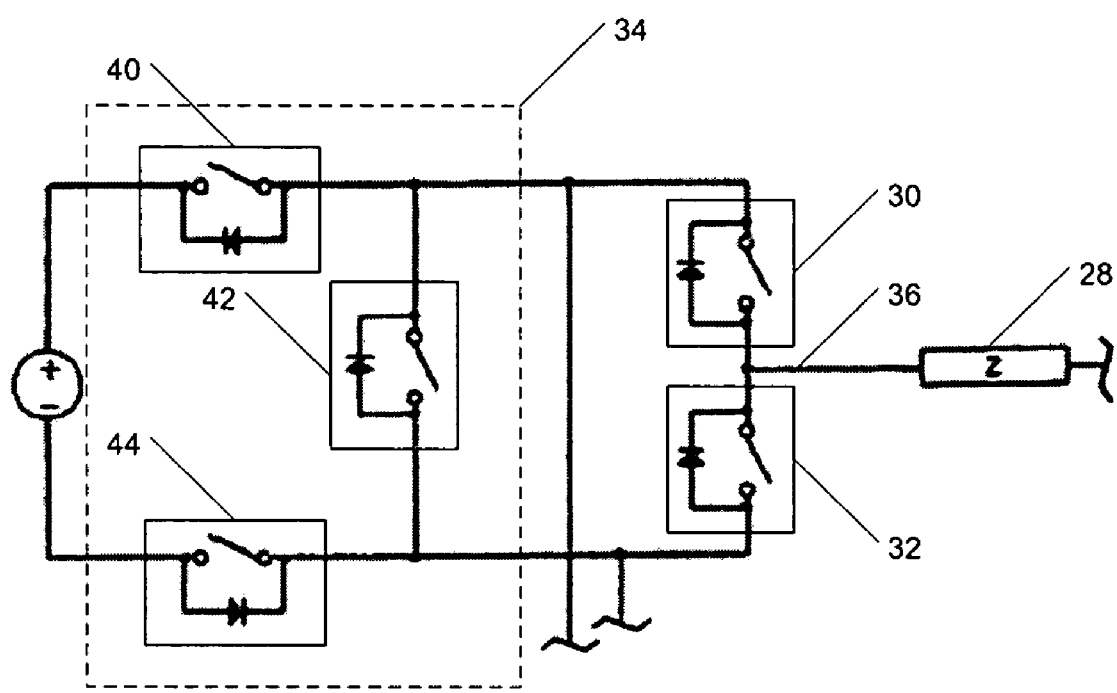
FIG. 2 is an electrical schematic showing an embodiment of the circuit for maintaining electrical conditions at a connection point between two circuit switches in the case of a failure of any one of the two circuit switches.

Now referring to FIG. 2, there is shown another circuit 34 for maintaining electrical conditions at a connection point between two circuit switches, respectively 30 and 32, in the case of a failure of any one of the two circuit switches 30 and 32.

The circuit 34 for maintaining electrical conditions comprises a first actuable switch 42, a second actuable switch 40 and a third actuable switch 44. More precisely, the first actuable switch 42 is connected in parallel with the first switch 30 and the second switch 32. The second actuable switch 40 is connected in series with a first end of the assembly comprising the first switch 30. The third actuable switch 44 is connected in series with a second end of the assembly comprising the first switch 30 and the second switch 32.

A control unit, not shown in FIG. 2, may be used in order to control the first actuable switch 42, the second actuable switch 40 and the third actuable switch 44. It will be appreciated that the control unit may be used to monitor the operating state of the first switch 30 and the second switch 32.

In the embodiment disclosed herein, the connection point 36 is connected to a phase Z 28. Still in the present embodiment, the second actuable switch 40 and the third actuable switch 44 are powered using a power unit.

It will further be appreciated that in this embodiment, the first switch 30, the second switch 32, the first actuable switch 42, the second actuable switch 40 and the third actuable switch 44 are semi-conductor devices which are controllable switches, bidirectional in current and unipolar in voltage.

Figure 3:
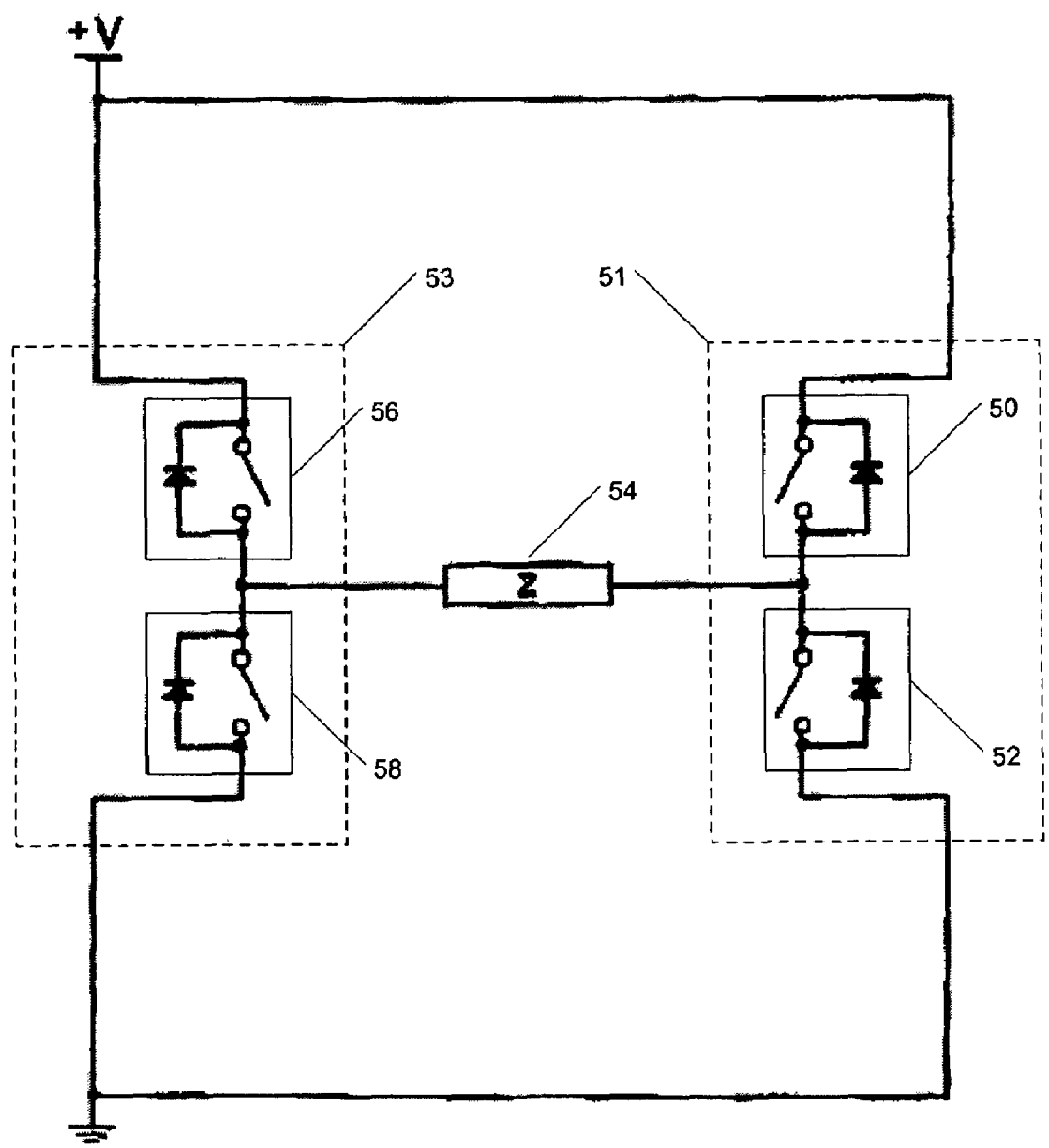
FIG. 3 is an electrical schematic showing a prior art single phase driving circuit.

Now referring to FIG. 3, there is shown a prior art single phase driving circuit for driving a phase 54. The single phase driving circuit comprises a right rail 51 and a left rail 53. The right rail 51 comprises a first switch 50 and a second switch 52. The left rail 53 comprises a first switch 56 and a second switch 58.

The skilled addressee will appreciate that the first switch 56, the second switch 58, the first switch 50 and the second switch 56 are used to drive the phase 54. The right rail 51 and the left rail 53 share the same power source in the embodiment disclosed. Alternatively, each of the right rail 51 and the left rail 53 may be powered using a separate power source.

Figure 4:
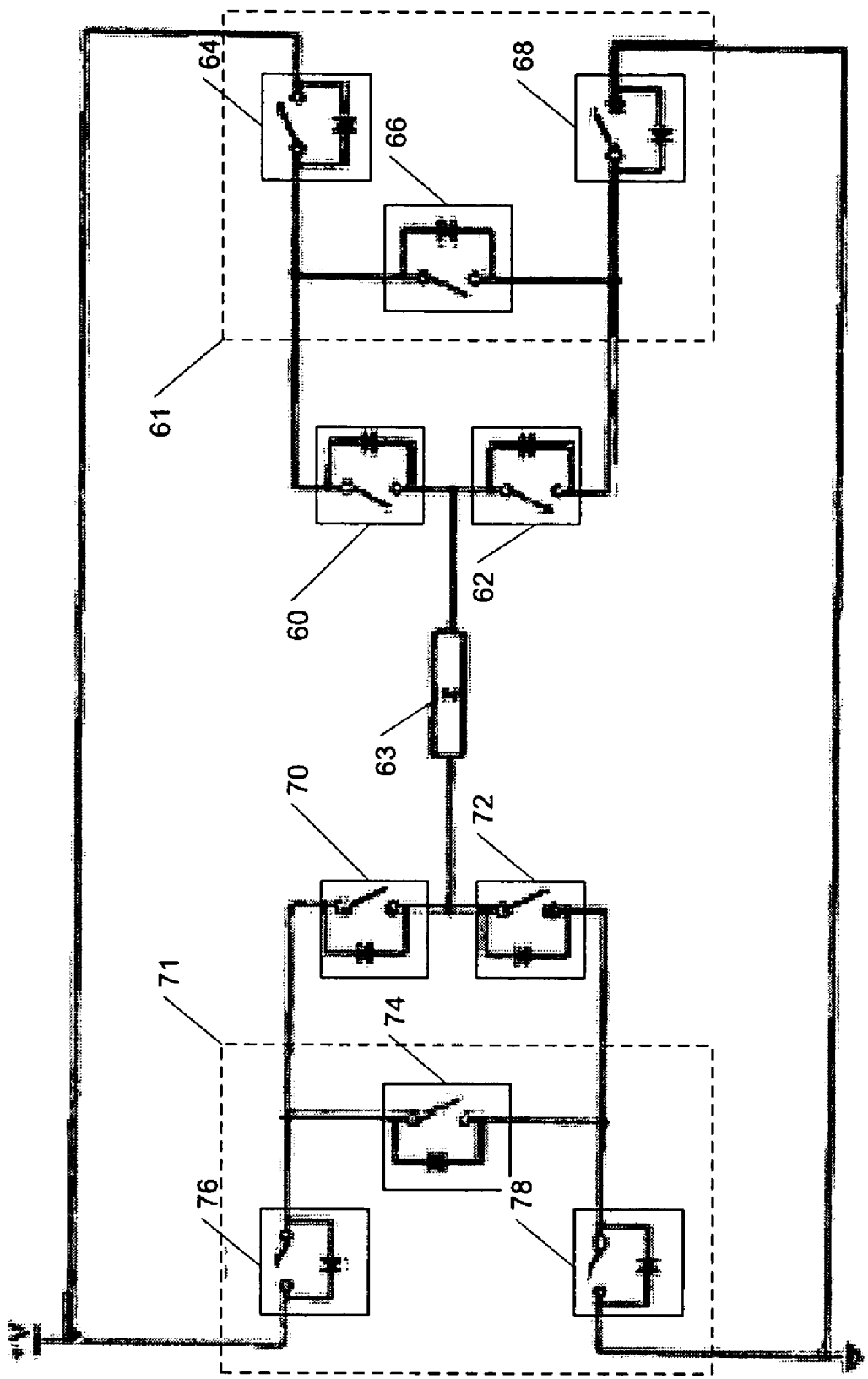
FIG. 4 is an electrical schematic showing an embodiment where a circuit for maintaining electrical conditions in a single phase driving circuit.

Now referring to FIG. 4, shows an embodiment of the single phase driving circuit disclosed in FIG. 3 on which a circuit is added according to an embodiment of the invention.

The added circuit comprises a first element 71 and a second element 61 and it is intended to provide a remedial strategy in case of a failure of any one of the switches. The first element 71 and the second element 61 are similar to the circuit 34 disclosed in FIG. 2. It will be appreciated that redundancy is provided to the single phase driving circuit. Therefore increase reliability of the overall circuit is expected.

It is understood that the circuit (i.e., first element 71) operates in the similar manner to circuit 22 of FIG. 1 and circuit 34 of FIG. 2. That is, upon short circuit failure of at one of switches 70 and 72 (i.e., failure of a power rail), actuable switches 76 and 78 open while actuable switch 74 closes thereby disconnecting the failed power rail from its power source.

Figure 5:
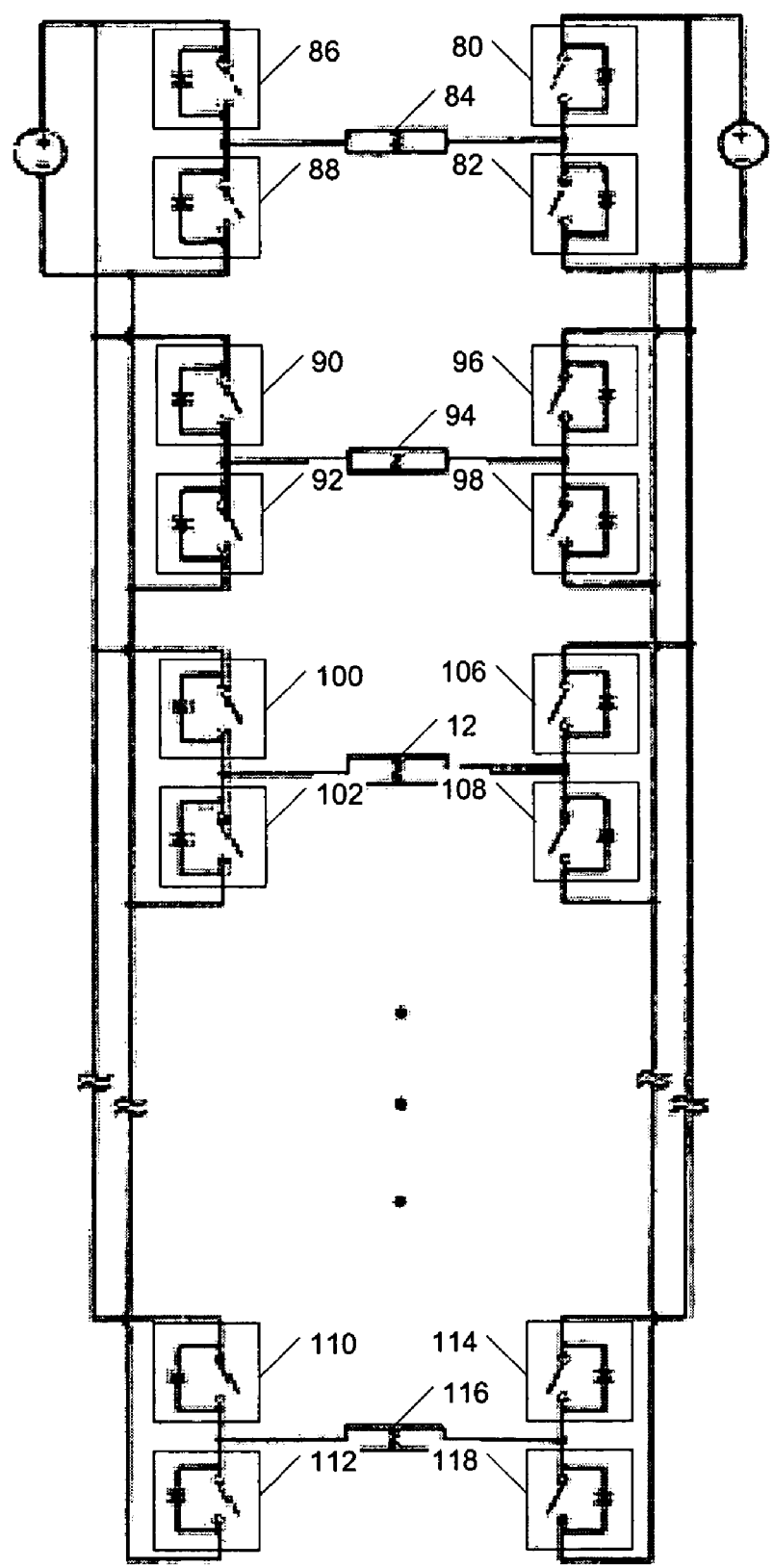
FIG. 5 is an electrical schematic showing a prior art N-phase driving circuit.

Now referring to FIG. 5, there is shown a prior art N-phase driving circuit for driving an N-phase component. More precisely, the N-phase driving circuit is used to drive a first phase 84, a second phase 94, a third phase 104 . . . and an Nth-phase 116.

More precisely, the first phase 84 is driven by a first group of switches comprising switch 86 and switch 88. The first phase 84 is further driven by a second group of switches comprising switch 80 and switch 82.

The second phase 94 is driven by a first group of switches comprising switch 90 and switch 92. The second phase 94 is further driven by a second group of switches comprising switch 96 and switch 98.

The third phase 104 is driven by a first group of switches comprising switch 100 and switch 102. The third phase 104 is further driven by a second group of switches comprising switch 106 and switch 108.

Finally, the Nth-phase 116 is driven by a first group of switches comprising switch 110 and switch 112. The Nth-phase 116 is further driven by a second group of switches comprising switch 114 and switch 118.

It will be appreciated by the skilled in the art that each phase is driven similarly to the phase 63 as disclosed in FIG. 4. Furthermore, it will be appreciated that each first group of switches to a first power unit while each second group of switches is connected to a second power unit.

Figure 6:
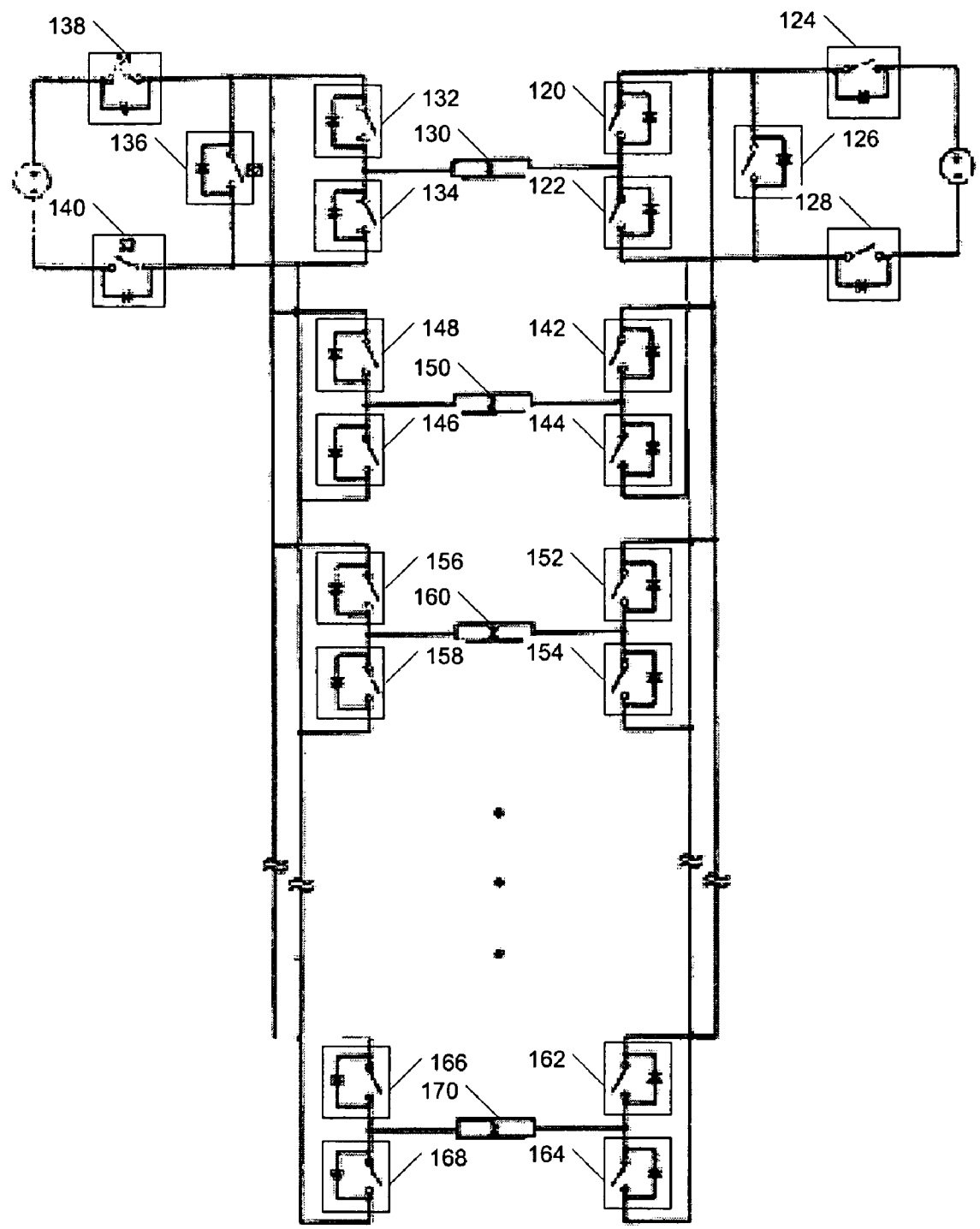
FIG. 6 is an electrical schematic showing an embodiment where a circuit for maintaining electrical conditions in an N-phase driving circuit.

Now referring to FIG. 6, there is shown a circuit for maintaining electrical conditions in the N-phase driving circuit disclosed in FIG. 5. The circuit comprises a first part 137 and a second part 127. The first part 137 comprises a first actuable switch 136, a second actuable switch 138 and a third actuable switch 140. The second part 127 comprises a first actuable switch 126, a second actuable switch 124 and a third actuable switch 128.

The first actuable switch 136 is connected in parallel with the first switch 132 and the second switch 134, with the first switch 148 and the second switch 146, with the first switch 156 and the second switch 158, and with the first switch 166 and the second switch 168. The second actuable switch 138 is connected in series with a first end of the assembly comprising the first switch 132, in series with a first end of the assembly comprising the first switch 148, in series with a first end of the assembly comprising the first switch 156, in series with a first end of the assembly comprising the first switch 156. The third actuable switch 140 is connected in series with a second end of the assembly comprising the first switch 132 and the second switch 134, in series with a second end of the assembly comprising the first switch 148 and the second switch 134, in series with a second end of the assembly comprising the first switch 156 and the second switch 158, in series with a second end of the assembly comprising the first switch 166 and the second switch 168.

Similarly, the first actuable switch 128 is connected in parallel with the first switch 120 and the second switch 122, in parallel with the first switch 142 and the second switch 144, in parallel with the first switch 152 and the second switch 154, in parallel with the first switch 162 and the second switch 154. The second actuable switch 124 is connected in series with a first end of the assembly comprising the first switch 120, in series with a first end of the assembly comprising the first switch 142, in series with a first end of the assembly comprising the first switch 152, in series with a first end of the assembly comprising the first switch 162. The third actuable switch 128 is connected in series with a second end of the assembly comprising the first switch 120 and the second switch 122, in series with a second end of the assembly comprising the first switch 142 and the second switch 144, in series with a second end of the assembly comprising the first switch 152 and the second switch 154, in series with a second end of the assembly comprising the first switch 162 and the second switch 164. A control unit, not shown in FIG. 6, is used to drive switches 124, 126, 128, 136, 138 and 140.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

I claim:

1. An electronic circuit for maintaining electrical conditions at a connection point in a circuit comprising two circuit switches serially connected via the connection point in case of a failure of any one of said two circuit switches, the circuit comprising a first end and a second end between which the two circuit switches are located, said electronic circuit comprising:
    a first actuable switch connected in parallel with said two circuit switches;
    a second actuable switch connected in series with said first end;
    a third actuable switch connected in series with said second end;
    a control unit for controlling said first actuable switch, said second actuable switch and said third actuable switch depending on a status of any one of said two circuit switches.

2. The electronic circuit as claimed in claim 1, wherein said control unit further receives a status signal from each of said two circuit switches.

3. An electronic circuit for providing a remedial strategy in case of a failure of any one of two serially connected switches in an N-phase driving circuit, wherein each side of a given phase is connected between said two serially connected switches having current blocking means, said two serially connected switches comprising a first end and a second end between which said two serially connected switches are located, said electronic circuit comprising:
    a first actuable switch, having current blocking means, connected in parallel with said two serially connected switches;
    a second actuable switch, having current blocking means, connected in series with said first end;
    a third actuable switch, having current blocking means, connected in series with said second end;
    a control unit for controlling said first actuable switch, said second actuable switch and said third actuable switch depending on a status of any one of said two serially connected switches.

4. The electronic circuit as claimed in claim 3, wherein N is equal to 1.

5. The electronic circuit as claimed in claim 3, wherein N is greater than 1.

6. An N-phase driving circuit having remedial strategy capacities for driving a phase of a motor, said driving circuit comprising said electronic circuit claimed in claim 3, wherein said electronic circuit is connected on one side of a given phase.

7. A method for dynamic reconfiguration of a DC-to-AC inverter comprising first and second power rails, each said rail having a power source, said method comprising:
    monitoring said first and second power rails for short-circuit failure; and
    upon failure of one of said power rails, disconnecting said failed power rail from its power source.

8. The method as claimed in claim 7, wherein said monitoring comprises verifying the status of a switch on one of said first and second power rails.

9. The method as claimed in claim 8, further comprising receiving a status signal from said switch on one of said first and second power rails.

10. The method as claimed in claim 7, wherein said disconnecting comprises changing the status of an actuable switch to create an open circuit.

* * * * *